United States Patent [19]
Anderson

[11] 3,738,082
[45] June 12, 1973

[54] PACKAGING MACHINE WITH IMPROVED SEALING HEAD

[76] Inventor: Ralph F. Anderson, 332 Calvin Park Boulevard, Rockford, Ill. 61107

[22] Filed: Apr. 14, 1971

[21] Appl. No.: 133,872

[52] U.S. Cl. ................................................. 53/329
[51] Int. Cl. ............................................. B65b 51/16
[58] Field of Search ..................... 53/329, 373, 388, 53/DIG. 2, 180, 184, 112 A, 77; 219/244; 100/93 RP, 153, 168

[56] References Cited
UNITED STATES PATENTS

| | | | |
|---|---|---|---|
| 963,942 | 7/1910 | Richardson | 219/244 X |
| 1,037,573 | 9/1912 | Allen | 219/244 X |
| 1,592,975 | 7/1926 | Hearne | 219/244 |
| 3,086,100 | 4/1963 | Carrozza et al | 219/244 |
| 3,112,590 | 12/1963 | O'Brien | 53/373 X |
| 3,436,894 | 4/1969 | Sorensen | 53/373 X |
| 3,457,699 | 7/1969 | Kinney et al | 53/373 |
| 3,546,433 | 12/1970 | Johnson | 219/244 X |
| 3,553,930 | 1/1971 | Anderson et al | 53/329 X |

Primary Examiner—Robert L. Spruill
Assistant Examiner—Horace M. Culver
Attorney—McCanna, Morsbach, Pillote & Muir

[57] ABSTRACT

The machine includes an endless conveyor and a sealing head for sealing a cover member to each container. The sealing head has a stationary core and an outer sleeve rotatably mounted on the core. A sprocket, which is connected to the sleeve, meshes with the conveyor chain to rotate the sleeve as the conveyor is advanced. The sealing head is moved to a tilted, inoperative position by lifting the end opposite the sprocket which remains meshed with the chain. The tilting also controls switching of the conveyor drive.

18 Claims, 5 Drawing Figures

3,738,082

Inventor
Ralph F. Anderson

By McCanna, Marsbach, Pillote & Muir
Attys

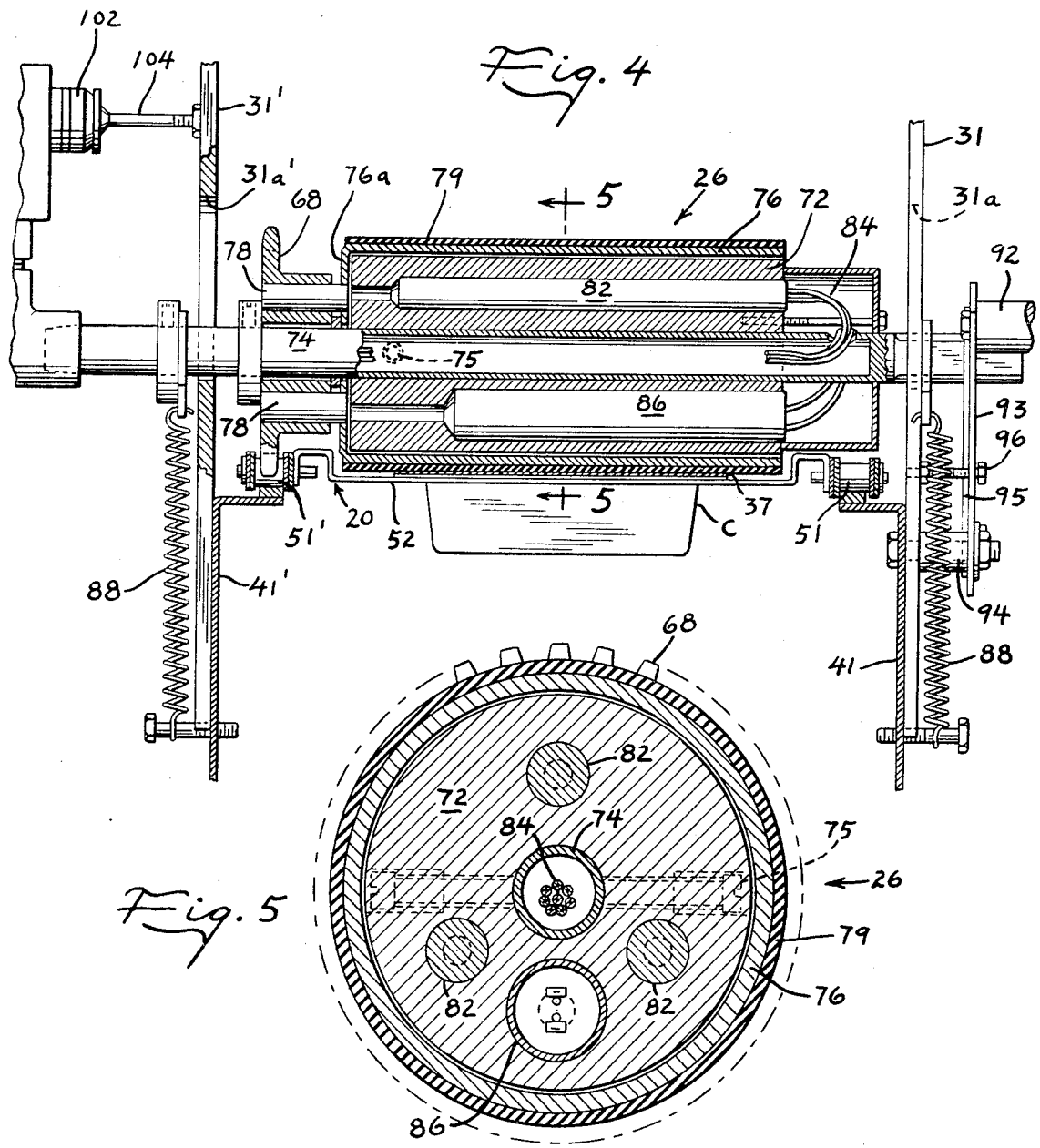

PACKAGING MACHINE WITH IMPROVED SEALING HEAD

BACKGROUND

The invention pertains generally to packaging and more particularly to a packaging machine for closing containers or filled receptacles by means of a sealing head.

Various packaging machines for closing containers or filled receptacles are known. Many are complex, however, a simplified packaging machine is described in U.S. Pat. No. 3,553,930, issued Jan. 12, 1971 to Ralph F. Anderson and Robert P. Sorensen. That patent discloses a packaging machine which has an endless conveyor, and a manually operated crank which moves a rotary sealing head into and out of sealing position. The crank also controls actuation of the conveyor drive in correlation with moving the sealing head. It is desirable to provide a packaging machine which has (1) greater room between the sealing head and conveyor when the head is in inoperative position, (2) a manually operated crank for moving the sealing head but with considerably less force than heretofore, and (3) simplified switching of the conveyor.

Previous heat sealing heads for packaging machines have had a plurality of heating elements therein. For various reasons, these elements may not heat an equal amount. Additionally, they are usually at spaced locations in the sealing head. For these reasons the sealing head frequently has non-uniform surface temperatures with hot areas and cooler areas. This can cause undesirable non-uniform sealing. It is desirable to have a rotary heat sealing head which has a uniform surface temperature. Additionally, some prior rotary heat sealing heads have required a sliding electrical contact to supply current to the rotating heating elements; for example, see U.S. Pat. No. 3,436,894, issued Apr. 8, 1969 to Robert P. Sorensen. A heat sealing head which eliminates this sliding contact is desirable.

SUMMARY

The present invention relates to a packaging machine with an improved sealing head arrangement.

An object of the present invention is to provide a packaging machine having a heat sealing head which has a substantially uniform surface temperature.

Another object is to provide a packaging machine with a rotary heat sealing head but with no movable electrical contacts in the head.

Still another object is to provide a packaging machine with a heat sealing head and a thermostat which is responsive to temperature adjacent the sealing operation.

It is another object to provide a packaging machine with a stationary core and a rotatable outer shell which moves freely on the core.

Another object of the present invention is to provide a packaging machine having a sealing head which requires minimum force to move to inoperative position.

Yet another object is to provide a packaging machine with a sealing head which is tilted to inoperative position and in which the tilting also controls actuation of the conveyor.

Another object is to provide a packaging machine having a movable conveyor and a sealing head movable between sealing and inoperative positions, and so arranged that continuity of the sealing operation is assured even through any stoppages.

These, and other objects and advantages of the present invention, will become apparent as the same becomes better understood from the following detailed description when taken in conjunction with the accompanying drawings.

DRAWINGS

FIG. 4 is a cross-sectional view taken generally along line 4—4 of FIG. 1 and on a greatly enlarged scale; and FIG. 5 is a section through the sealing head taken along line 5—5 of FIG. 4 and on a still larger scale.

DESCRIPTION

Figure 1:
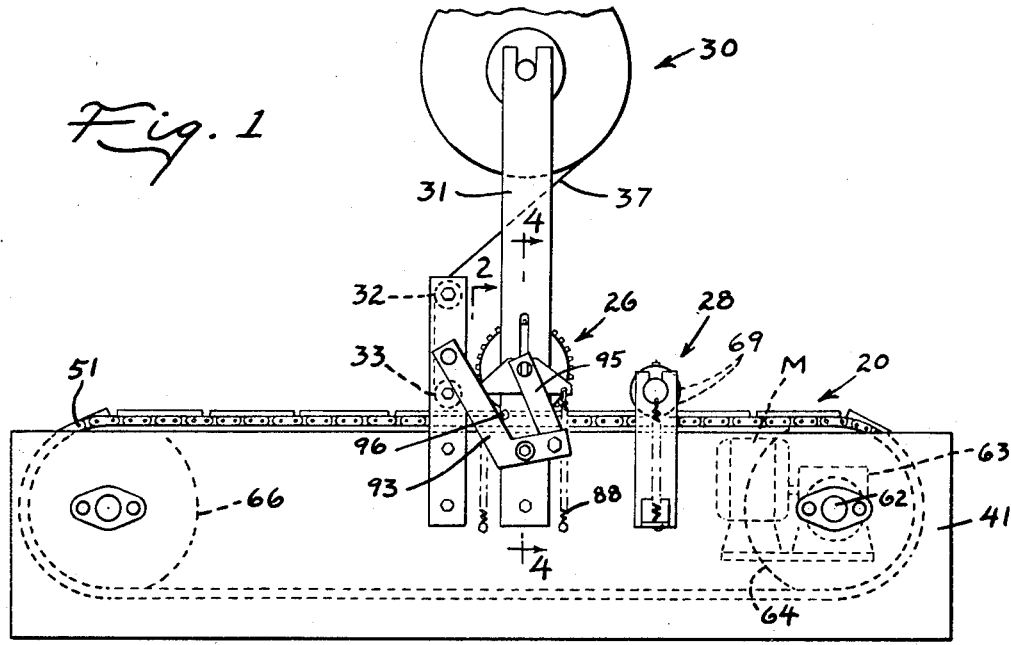
FIG. 1 is a front elevational view of a machine constructed in accordance with the present invention.

Reference is now made more particularly to the drawings which illustrate the best presently known mode of carrying out the invention and wherein similar reference characters indicate the same parts throughout the several views.

An apparatus embodying the present invention includes a conveyor 20 for advancing a number of containers C past a sealing head 26 and a cutter 28 to the outlet end of the machine. A supply of cover material, shown as a roll 30, is supported on the machine in any convenient manner as by upright members 31 and 31'. A web 37 is withdrawn from the roll 30 and entrained over laterally extending rollers 32, 33 (see FIG. 1) to a position overlying the container C. This web is sealed to the containers by means of the sealing head 26 and the packages are separated by cutting the web in an area between the adjacent containers as by the cutter 28. The general structure of the apparatus conveniently includes channel-shaped side panels 41 and 41' on which the conveyor 20 is mounted.

In the embodiment illustrated, sealing head 26 is arranged for heat sealing the web 37 to the container C. Thus, container C is preferably made of material capable of having a cover heat sealed thereto. The cover or web 37 is preferably a thermoplastic material of any type compatible with the container and, by way of illustration, includes sheets of synthetic resin and sheets of paper or the like coated with a thermoplastic material.

The conveyor 20 includes spaced chains 51, 51' and a plurality of container receivers 52 supported between the chains. The receivers 52 have an opening therein shaped for receiving the container C and are arranged to support outwardly extending flanges of the container C on the upper surface of the receiver 52, as best shown in FIG. 4. The upper flight of the chains 51, 51' are supported on the upper flanges of the side panels 41, 41', respectively. In the present embodiment, the conveyor 20 is driven by a motor M. As shown in FIG. 1, the motor M drives a drive shaft 62 through a gear reducer 63. A pair of sprockets 64 are mounted on drive shaft 62 and are engaged with the chains 51, 51'. The sprockets 64 drive the chains as the drive shaft is rotated. Similarly, sprockets 66 are provided at the other end of the machine.

Figure 2:
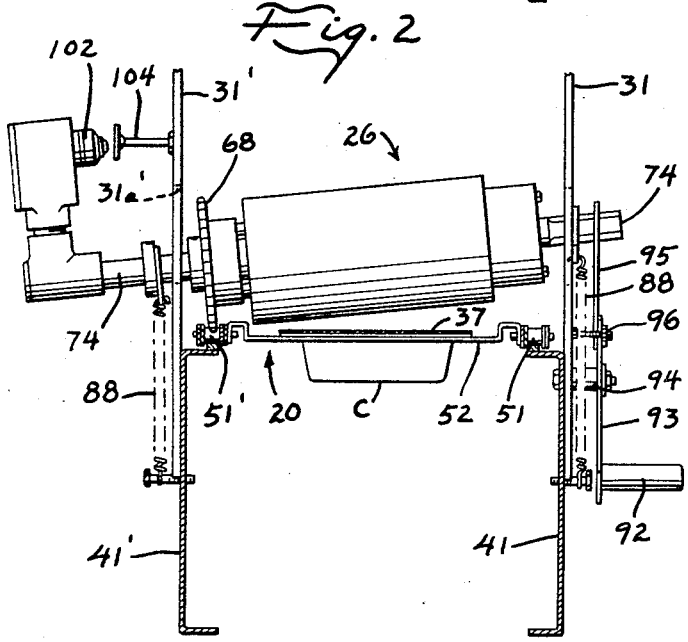
FIG. 2 is a cross-sectional view taken generally along line 2—2 of FIG. 1 but on a larger scale and with the sealing head in tilted, inoperative position.

Referring now to FIGS. 2 and 4, it can be seen that chain 51' provides a plurality of spaced teeth at one side of the conveyor 20. A sprocket, such as at 68, may be engaged with the chain to drive the sealing head 26. This arrangement provides a positive relationship between the sealing head 26 and the conveyor 20. Similarly, a sprocket 69 is provided for driving the cutter 28.

Figure 3:
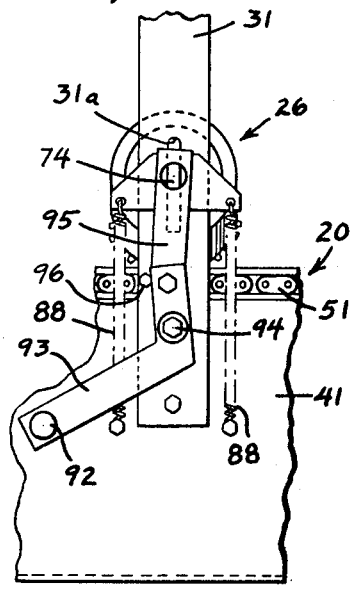
FIG. 3 is a fragmentary elevational view as seen from the right of FIG. 2.

Referring now particularly to FIGS. 4 and 5, the sealing head 26 includes a stationary core 72 mounted on a shaft 74. The core 72 is secured to the shaft by means of fasteners 75. The shaft 74 is tubular throughout a substantial portion of its length for a reason which will hereafter become apparent. At one end, the shaft 74 extends through a slot 31a' in upright member 31' and is spaced thereabove in the sealing position. At the opposite end, shaft 74 extends through a slot 31a in upright member 31. This end of the shaft 74 is flattened at opposite sides to engage the sides of the slot 31a, as best seen in FIG. 3, and hold the shaft and core against rotation. The core 72 is preferably formed of a heat conductive material such as cast iron and has a cylindrical outer surface. A cylindrical outer sleeve 76 is rotatably mounted on the core 72 and has an inwardly extending end portion 76a at one end of the core. The aforementioned sprocket 68 is rotatably mounted on shaft 74 and is secured to the sleeve 76 by means of pins 78 extending into end portion 76a. The sleeve 76 is also formed of a heat conductive material and this material is preferably different than that of the core and has a coefficient of expansion at least as great as that of the core and preferably higher. Suitable materials for the outer sleeve 76 are brass or bronze. A rubber cover 79 is secured to the outer sleeve 76 and is particularly advantageous for some sealing operations. It can be seen that the outer sleeve 76 is rotatably mounted on the stationary core 72 and is rotated correlative with the movement of the conveyor 20 by means of the sprocket 68 engaged with the chain 51'.

Heat means is provided in the core 72 for heating it and the outer shell 76 to a temperature sufficient for sealing the cover material 37 to the container C. In the embodiment illustrated, a plurality of heating elements 82 are disposed in cavities in the core 72. These heating elements are preferably spaced from each other and extend along the length of the core 72 parallel to the core axis. Suitable electrical connections, such as wires 84, supply current to the heating elements. A thermostat probe 86 is inserted into a cavity in the core 72 and is wired to control flow of current to the heating elements 82 and thereby control the temperature of the sealing head. The wires 84 advantageously extend through the tubular shaft 74 to the one end or back side of the machine. Since the core and the heating elements are held stationary, it can be seen that no sliding electrical connection is required.

Since the outer sleeve 76 rotates around the periphery of the core 72, the temperature exchange occurs through out all areas of the circumference of the core and any hot spots are averaged out. In this manner, a uniform temperature is achieved in the outer sleeve. This uniform temperature seems to achieve a lesser temperature gradient between the center and outer surface of the sealing than similarly sized and shaped solid sealing heads. This occurs notwithstanding the theoretically insulative air gap between the relatively rotating core and outer sleeve. In the embodiemnt illustrated, the cast iron core 72 has an outer diameter of 2.996 to 2.998 inches and the brass or bronze sleeve 76 has an inner diameter of 3.001 to 3.003 inches. Preferably the outer sleeve is relatively thin, that is, from three-sixteenths to one-fourth inch in thickness.

Preferably, the thermostat probe 86 is located at the bottom of the core adjacent the position where the sealing operation occurs. In this manner, it is responsive to the temperature at the sealing positon and can accurately control the required or desired sealing temperature. Thus, it effectively senses the average temperature described above. A plurality of springs 88 at the front and rear sides of the machine resiliently urge the sealing head towards its sealing position. A manually operable means is provided for moving the sealing head 26 from its sealing position (FIG. 4) to its inoperative position (FIG. 2). This is advantageously in the form of a laterally extending handle 92 mounted on an L-shaped member 93. Member 93 is rotatably mounted on the machine by means of shaft 94 and is connected to one end of link 95 which has its other end connected to shaft 74. It is deemed obvious that movement of member 93 raises or lowers the shaft 74. A stop 96 is provided to hold the linkage in an overcenter locked position when the shaft 74 is raised, as best seen in FIG. 3.

As can be seen in FIG. 2, raising of the outer end of shaft 74 operates to tilt the sealing head about the lower end of slot 31a' in member 31'. In this manner, the sprocket 68 remains engaged with chain 51' yet, effectively, the sealing head 26 is raised a greater distance above the receivers 52 than has heretofore been achieved. At the same time, the movement of the sealing head to its inoperative position is against the force of the springs 88 only at the front of the machine and hence a lesser lifting force is required than that in the aforementioned U. S. Pat. No. 3,553,930.

The tilting operation is utilized to achieve still another function. As can be seen in FIGS. 2 and 4, a switch 102 is mounted on shaft 74 to engage an actuating member 104 on the machine. Switch 102 controls power to the motor M and thus controls actuation of conveyor 20. When the sealing head 26 is in its sealing position of FIG. 4, the switch 102 is closed by member 104 and the conveyor is operated. When the sealing head 26 is tilted, the tilting moves the switch 102 out of engagement with member 104 and the conveyor is stopped.

It is now deemed obvious that the above-described packaging machine includes an improved sealing head which has a stationary core and an outer sleeve rotatably mounted on the core. This arrangement provides for improved heat transfer while simplifying the electrical connections to the heating elements. A sprocket connected to the sleeve meshes with the conveyor chain to rotate the sleeve as the conveyor is advanced. The sealing head is moved to a tilted, inoperative position while the sprocket remains meshed with the chain and this tilting also controls switching of the conveyor drive.

While a preferred embodiment of the invention has herein been illustrated and described, this has been done by way of illustration and not limitation, and the invention should not be limited except as required by the scope of the appended claims.

I claim:

1. A packaging machine for packaging in open-topped containers and including a longitudinally extending, endless conveyor for supporting the open-topped containers and having a plurality of longitudinally spaced teeth adjacent one side thereof; drive means for driving the conveyor to advance the containers and teeth in a predetermined path; means for supplying and positioning a heat sealable cover material adjacent the tops of the containers; and a heat sealing head in rolling engagement with the cover material in a sealing position for sealing the cover material to the containers and movable to an inoperative position out of engagement with the cover material, characterized in that the sealing head includes a non-rotatable core; an outer shell rotatably mounted on the core; a sprocket mounted in driving relation to the outer shell at one end of the sealing head and engaged with the conveyor teeth at said one side for rotating the shell as the conveyor is advanced; heat means in the core for heating the core and shell to a temperature sufficient for sealing the cover material to the containers; mounting means at the end of the sealing head opposite said one end for holding the core against rotation and for slidably mounting the core, and hence the sealing head, for movement between the sealing and inoperative positions; and moving means engaged with the mounting means for moving the sealing head by lifting said opposite end to tilt the sealing head while the sprocket remains engaged with the conveyor teeth.

2. A packaging machine as set forth in claim 1 wherein the core is at least partly formed of a heat conductive material, and has a chamber in which the heat means is disposed; and including a thermostat in the core for controlling the temperature of the sealing head.

3. A packaging machine as set forth in claim 2 wherein the heat means includes a plurality of heaters in the core, and the thermostat is adjacent the lowermost portion of the core.

4. A packaging machine as set forth in claim 3 wherein the outer shell is relatively thin and formed of a material having a greater coefficient of expansion than the material of the core.

5. A packaging machine as set forth in claim 3 including a switch mounted for movement with the tilting of the sealing head and for controlling actuation of the drive means; and means on the machine for engaging the switch to actuate the drive means when the sealing head is in sealing position and for deactuating the drive means when the sealing head is in tilted, inoperative position.

6. A packaging machine as set forth in claim 5 wherein the heaters are electrical heaters having wires connected thereto and to the thermostat; the core has a hollow tube which extends beyond the ends of the outer shell, the wires extending through the tube at said one end of the sealing head, the switch being mounted on the tube at said one end of the sealing head, the sprocket being rotatably mounted on the tube, and the end of the tube opposite said one end cooperating with the mounting means for holding the core against rotation and for slidably mounting the core; and the moving means is manually operable and includes linkage providing an overcenter lock when the sealing head is in inoperagive position.

7. A packaging machine as set forth in claim 6 wherein the endless conveyor includes a pair of spaced chains, a plurality of pocketed container receivers supported between the chains, and one chain providing the spaced teeth which drive the sprocket of the sealing head.

8. In a packaging machine for packaging in open-topped containers and including a longitudinally extending, endless conveyor for supporting the open-topped containers and having a plurality of longitudinally spaced teeth adjacent one side thereof; drive means for driving the conveyor to advance the containers and teeth in a predetermined path; means for supplying and positioning a continuous strip of cover material adjacent the tops of the containers; and a sealing head in rolling engagement with the cover material in a sealing position for sealing the same to the containers; characterized in that the sealing head includes a sprocket at one end thereof and engaged with the conveyor teeth at said one side for rotating the head as the conveyor is advanced; mounting means at the other end of the sealing head for slidably mounting the sealing head; and moving means engaged with the mounting means for moving the sealing head from the sealing position to an inoperative position out of engagement with the cover material by lifting said other end and tilting the sealing head about said one end.

9. The combination of claim 8 wherein the endless conveyor includes a pair of spaced chains, a plurality of pocketed container receivers supported between the chains, and one chain providing the spaced teeth which drive the sprocket to rotate the sealing head.

10. The combination of claim 8 including a switch mounted for movement with the sealing head as it is tilted and for controlling actuation of the drive means; and means on the machine for engaging the switch to actuate the drive means when the sealing head is in sealing position and for deactuating the drive means when the sealing head is in tilted position.

11. The combination of claim 10 wherein the sealing head has electrical heating means therein for heating the same, a hollow tube extending from one end of the sealing head at the axis thereof, and wires in the tube connected to the heating means, and wherein the switch is mounted on the tube.

12. The combination of claim 11 wherein the sealing head includes a stationary cylindrical core in which the heating means is disposed, and an outer sleeve rotatably mounted on the core and connected to the sprocket for movment therewith; and wherein the sprocket is rotatably mounted on the tube.

13. The combination of claim 8 including spring means at opposite ends of the sealing head for resiliently urging the sealing head toward the conveyor to press the cover material against the containers; and wherein the moving means is manually operable and includes linkage at said other end providing an overcenter lock to hold the sealing head in tilted, inoperaive position against the force of the spring means at said other end.

14. In a packaging machine for packaging in open-topped containers and including a longitudinally extending conveyor for supporting the containers, drive means for driving the conveyor to advance the containers in a predetermined path, means for supplying and positioning a heat sealable cover material adjacent the tops of the containers, and a heat sealing head extending crosswise of the conveyor and engaged with the cover material for sealing the cover material to the containers; the improvement being that the heat sealing head comprises: a solid core of heat-conductive material and having a smooth outer surface in the shape of a right circular cylinder; means for holding the core against rotation; a plurality of elongated, crosswise extending, spaced heaters embedded in the core parallel to the axis of the core and all located inwardly of the outer surface but adjacent the circumferential periphery thereof; the heaters being in heat-conductive relationship with the core for heating the core; a relatively thin outer shell of heat-conductive material rotatably mounted on the core; the thin outer shell being made of a different material than the core and having a greater coefficient of expansion than that of the core; the thin outer shell having cylindrical inner and outer surfaces with the inner surface contiguous to and in heat-conductive relationship with the core; and a thermostat mounted in the core closely adjacent the position where the rotatable outer shell seals the cover material to the containers for sensing the temperature of the core adjacent said position and controlling the heaters accordingly.

15. The combination of claim 14 wherein the means for holding the core against rotation includes a shaft extending from both ends of the core; and including means rotatably mounted on the shaft and secured to the outer shell for rotating the shell correlative to the speed of the conveyor.

16. The combination of claim 14 including a rubber cover on the outer shell.

17. The combination of claim 14 wherein the rotatable outer shell has cylindrical inner and outer surfaces and has a thickness in the range of about three-sixteenths to one-fourth inch.

18. The combination of claim 14 wherein the core is cast iron, and the outer shell is one of the materials from the group consisting of brass and bronze.

* * * * *